United States Patent Office 3,084,997
Patented Apr. 9, 1963

3,084,997
CHLORINE-FREE PHOSPHORUS NITRILE-AMIDES AND METHOD OF THEIR PREPARATION
Margot Becke, nee Goehring, Heidelberg, Germany, assignor to Olin Mathieson Chemical Corporation, a corporation of Virginia
No Drawing. Continuation of application Ser. No. 645,421, Mar. 12, 1957. This application Aug. 26, 1960, Ser. No. 52,056
Claims priority, application Germany Mar. 17, 1956
14 Claims. (Cl. 23—190)

The present invention relates to condensation compounds and a method of making the same, and more particularly it relates to the production of chemical compounds containing at least one nitrogen atom directly bound to two phosphorous atoms.

This application is a continuation of my copending application Serial No. 645,421, filed March 12, 1957, for "Condensation Compounds and Method of Making the Same," now abandoned.

Condensation compounds of the type to which the present invention relates may be used singly or in combination with other substances in the production of plastic materials and as flame retarding agents.

It is therefore an object of the present invention to provide for the production of condensation compounds containing one or more P—N—P groups.

It is another object of the present invention to provide a method for converting compounds which possess at least one direct bond between phosphorus and an amino group and which do not include any radicals which will react with the condensing agent hydrochloric acid, into condensation compounds containing in the molecule one or more P—N—P groups.

It is another object of the present invention to produce condensation compounds including one or more P—N—P groups, in an economical and simple manner suitable for large scale commercial production.

It is a further object of the present invention to produce in an economical and simple manner phosphams and tetramides of imido-polyphosphoric acids on a commercial scale.

Other objects and advantages of the present invention will become apparent from a further reading of the description and the appended claims.

With the above and other objects in view the present invention mainly consists in a method of producing a condensation product containing at least one nitrogen atom directly bound to two phosphorus atoms, comprising the step of reacting dry hydrogen chloride with at least one compound including at least one amino group directly bound to a phosphorus atom, so as to form ammonium chloride and a condensation product of the compound having at least one nitrogen atom directly bound to two phosphorus atoms.

The condensation reaction according to the present invention using the triamide of orthophosphoric acid as starting material, proceeds for instance as follows:

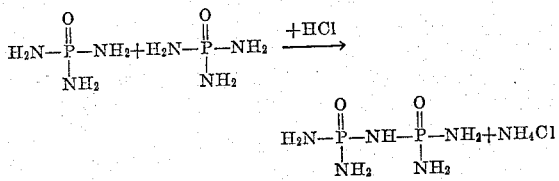

The first reaction product, the tetramide of imido-diphosphoric acid may undergo condensation when exposed to surplus hydrogenchloride but the reaction can easily be stopped in this stage. This method can also be used for the production of substituted tetramides of imido-diphosphoric acid. In this case the corresponding starting materials must be taken. Also substituted or non-substituted amides of higher polymeric acids can be condensed as described in the case of the triamide of orthophosphoric acid.

According to the present invention, the degree of condensation of compounds containing the P—N—P bond once or several times per molecule may be varied. This can easily be done by changing the conditions under which the condensation reaction is carried out, and particularly by changing the temperature. For example, a monomeric tetramide of imido-diphosphoric acid can be obtained in good yield if the condensation of the triamide of orthophosphoric acid is made with hydrogen chloride in the temperature range from $-60°$ to $+10°$ C. Higher temperatures give good yields of the next higher homolog, namely the pentamide of di-imido-triphosphoric acid. Condensation temperatures of 180° C. and more result in a mixture of amides of polyphosphoric acids of different degree of condensation. In each case vigorous stirring is recommended.

It must be noted, however, that the present invention is not limited to the production of amides of imido-diphosphoric acid. As already mentioned above, all compounds having bound at least one amino-group to phosphorus may be condensed with the aid of hydrogen chloride to products including at least one P—N—P bond. Besides the amides of phosphoric acid and the higher homologs, also phosphorus-nitrile-diamides may be condensed in this way to products comprising one or more P—N—P bonds. The resulting products in this case belong to the group of phosphams. Here, too, the degree of condensation may be varied by changes in the reaction temperature.

If the condensation reaction is carried out at a temperature of between 50 and 170°, the resulting phospham is nearly water insoluble, but hydrolyzes under the prolonged action of water. Condensation temperatures between $-113°$ C. (B.P. of HCl) and 0° C. give a phospham of the same composition, but of very good solubility in water.

This behaviour is probably due to the different degree of condensation of the products being produced by higher or lower temperatures. Generally, low temperature phosphams show higher activity than those produced at higher temperatures, probably because of the lower degree of condensation of such condensation products which are produced at lower temperatures.

Up to now it was only possible to obtain phosphams, i.e. phosphorus-nitrilamide by heating the reaction products of phosphorus chlorides or phosphorus-nitrilchloride and ammonia or ammonium-chloride at temperatures above 300°. The thus obtained products always contained varying quantities of chlorine, while phosphams produced according to the method of the present invention are entirely free of chlorine and are of greater reactivity than the phosphams produced at high temperatures in accordance with the above described method of the prior art. For instance, it is possible to hydrolyze phosphams produced according to the present method and at relatively low temperature, with 50% sulfuric acid within a period of 5 minutes.

The following examples are given as illustrative only of the method of the present invention, the invention however not being limited to the specific details of the examples.

EXAMPLE I

*Imido-Diphosphoric Acid Tetramide*

7 g. of phosphoric acid triamide are suspended in 300 ml. ether. Then a slow stream of dry HCl is introduced with vigorous stirring. The temperature is kept at $-15°$ C. After 3 hours the addition of HCl is stopped but stirring is continued for another 3 hours. The reaction product is then filtered under exclusion of atmospheric moisture. After washing with dry ether, 8.4 g. of a dry mixture is obtained.

This mixture is then washed with liquid ammonia in order to remove ammonium chloride. The residue is then once more filtered under exclusion of atmospheric moisture and a stream of a dry inert gas such as nitrogen, is used to carry away residual ammonia.

Yield of pure product: 5.6 g. (89%).

*Analysis.*—Calculated: 35.79% P; 40.47% N. Actual: 35.6% P; 40.4% N.

The product is slightly soluble in water. When heated over 70° C. it decomposes, thereby giving off ammonia. As proved by Debyeograms this product is isotype with diphosphoric acid-tetramide.

EXAMPLE II

Di-Imido-Triphosphoric Acid Pentamide

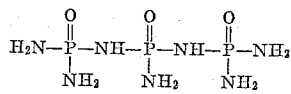

5 g. of phosphorus oxytriamide, OP (NH$_2$)$_3$ are suspended in 200 ml. dry ether. Dry HCl is then introduced under heating to 28°–30° C., whereby an exothermic reaction sets in. By cooling and reduction of the velocity of the introduced HCl stream, the temperature of the ether suspension is not allowed to exceed 32° C. The ether will be saturated with HCl after about 4 hours. The reaction mixture is then stirred for another 3 hours, while introducing only a slow HCl stream and keeping the temperature at 28°–30°. The reaction product is then filtered under exclusion of air humidity through a frit (G–3). The product is repeatedly washed with dry ether and dried over P$_4$O$_{10}$ in vacuo. Thus, about 6.3 g. of a colorless mixture of di-imido-triphosphoric acid pentamide and ammonium chloride is obtained. Thereafter ammonium chloride is removed by washing out with liquid ammonia. The residue amounts to 3.8 g. of di-imido-triphosphoric acid pentamide (86%). The product decomposes at 75° thereby splitting off ammonia.

*Analysis.*—Calculated: 37.0% P; 39.1% N. Actual: 37.0% P; 39.0% N.

EXAMPLE III

Phospham 20 g. of a dry mixture of phosphorus-nitrildiamide and ammonium chloride (this mixture is easily obtainable by known methods) are placed into a glass tube. Dry HCl is then introduced for 8 hours. The temperature rises thereby to about 70° C. and after the exothermic reaction has ceased, drops back to room temperature. The HCl in the tube is then removed by introducing dry nitrogen. The reaction product consists of phospham and ammonium chloride. After removal of ammonium chloride, 6.5 g. of phospham are obtained.

EXAMPLE IV

Phospham 5 g. of a dry mixture of phosphorus-nitrildiamide and ammonium chloride are brought into a glass tube and then cooled with liquid air. Condensation is then started by introducing HCl for about one hour, whereby further cooling is carried out with dry CO$_2$. The HCl liquefies within one hour and reacts with the amide. When cooling is ended, HCl evaporates. Excess HCl may be removed by introducing dry nitrogen. The reaction product is a mixture of phospham and ammonium chloride. The latter may be removed by washing with liquid ammonia. The residual phospham is easily water soluble.

Generally, it has been found advantageous to carry out the condensation reaction according to the present invention within a temperature range of between −60° C. and 150° C., however, depending on the degree of condensation and reactivity desired in the final product, it is preferred to carry out the condensation reaction according to the present invention, at temperatures of between −60° C. and 10° C. for products of high reactivity, at temperatures of about 80° C. for products of lesser reactivity and higher degree of condensation and at temperatures of about 150° C. for products of a high degree of condensation.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a condensation product containing at least one nitrogen atom directly bound to two phosphorus atoms, comprising the steps of reacting dry hydrogen chloride with at least one compound selected from the group consisting of phosphoric acid triamide and phosphorus nitrildiamide so as to form ammonium chloride and a condensation product of said compound having at least one nitrogen atom directly bound to two phosphorus atoms; and separating the thus formed condensation product.

2. A method of producing an imido-phosphoric acid amide condensation product, comprising the steps of reacting dry hydrogen chloride with phosphoric acid triamide at a temperature of −60° C. to +180° C. so as to form an imido-phosphoric acid amide condensation product and ammonium chloride; and recovering the thus-formed imido-phosphoric acid amide condensation product.

3. A method of producing imido-diphosphoric acid tetramide, comprising the steps of reacting dry hydrogen chloride with phosphoric acid triamide at a temperature of between −60° C. and +10° C., so as to form imido-diphosphoric acid tetramide and ammonium chloride; and recovering the thus-formed imido-diphosphoric acid tetramide.

4. A method of producing imido-diphosphoric acid tetramide, comprising the steps of introducing a stream of dry hydrogen chloride into a suspension of phosphoric acid triamide in ether while maintaining the temperature of the thus-formed reaction mixture at between −60° C. and +10° C., so as to form imido-diphosphoric acid tetramide and ammonium chloride; separating solid constituents of said reaction mixture consisting essentially of imido-diphosphoric acid tetramide and ammonium chloride from the remainder of the reaction mixture; and washing said separated solid constituents with liquid ammonia so as to remove ammonium chloride therefrom, whereby imido-diphosphoric acid tetramide is obtained.

5. A method of producing di-imido-triphosphoric acid pentamide, comprising the steps of reacting dry hydrogen chloride with phosphorus oxytriamide at a temperature above 10° C. and up to 32° C. so as to form di-imido-triphosphoric acid pentamide and ammonium chloride; and recovering the thus-formed di-imido-triphosphoric acid pentamide.

6. A method of producing di-imido-triphosphoric acid pentamide, comprising the steps of introducing a stream of dry hydrogen chloride into a suspension of phosphorus oxytriamide in ether while maintaining the temperature of the thus-formed reaction mixture at between 28° and 32° C. so as to form di-imido-triphosphoric acid pentamide and ammonium chloride; separating the thus-formed solid mixture of ammonium chloride and di-imido-triphosphoric acid pentamide from the remainder of said reaction mixture; and washing said solid mixture with liquid ammonia so as to remove ammonium chloride therefrom, whereby di-imido-triphosphoric acid pentamide is obtained.

7. A method of producing a chlorine-free condensed phosphorus nitrile-amide having at least one nitrogen atom linked directly to two phosphorus atoms, comprising the steps of reacting dry phosphorus-nitrildiamide with dry hydrogen chloride at a temperature of −113° C. to 170° C., so as to form a mixture of condensed phosphorus nitrile-amide having at least one nitrogen atom linked directly to two phosphorus atoms and ammonium chloride; and removing said ammonium chloride, whereby a condensed phosphorus nitrile-amide having at least one nitrogen atom linked directly to two phosphorus atoms free of chlorine is obtained.

8. A method of producing a water-soluble highly reactive chlorine-free condensed phosphorus nitrile-amide having at least one nitrogen atom linked directly to two phosphorus atoms, comprising the steps of reacting dry phosphorus-nitrildiamide with dry hydrogen chloride at a temperature of between −113° C. and 0° C., so as to form a mixture of condensed phosphorus nitrile-amide having at least one nitrogen atom linked directly to two phosphorus atoms and ammonium chloride; and washing said mixture with liquid ammonia so as to remove ammonium chloride therefrom, whereby a condensed phosphorus nitrile-amide having at least one nitrogen atom linked directly to two phosphorus atoms free of chlorine is obtained.

9. A method of producing a water-insoluble, hydrolyzable chlorine-free condensed phosphorus nitrile-amide having at least one nitrogen atom linked directly to two phosphorus atoms, comprising the steps of reacting dry phosphorus-nitrildiamide with dry hydrogen chloride at a temperature of between 50° and 170° C., so as to form a mixture of condensed phosphorus nitrile-amide having at least one nitrogen atom linked directly to two phosphorus atoms and ammonium chloride; and removing said ammonium chloride, whereby a water-insoluble hydrolyzable condensed phosphorus nitrile-amide having at least one nitrogen atom linked directly to two phosphorus atoms free of chlorine is obtained.

10. As a new composition of matter, imido-diphosphoric acid tetramide.

11. As a new composition of matter, di-imido-triphosphoric acid pentamide.

12. As a new composition of matter, a chlorine-free condensed phosphorus nitrile-amide having at least one nitrogen atom linked directly to two phosphorus atoms.

13. As a new composition of matter, a chlorine-free, water-soluble condensed phosphorus nitrile-amide having at least one nitrogen atom linked directly to two phosphorus atoms.

14. As a new composition of matter, a chlorine-free, water-insoluble hydrolyzable condensed phosphorus nitrile-amide having at least one nitrogen atom linked directly to two phosphorus atoms.

References Cited in the file of this patent

Klement et al.: "Die Darstellung von Imido-diphosphat und Nitrido-triphosphat," Zeitschrift für anorganische und allgemeine Chemie, Band 283, January 1956, pages 246–256.

Klement et al.: "Das thermische Verhalten von Natriumdiamido Phosphat, Darstellung von kondensierten Imidophosphaten," Zeitschrift für anorganische und allgemeine Chemie, Band 285, May 1956, pages 74–85.